United States Patent
Dai et al.

(10) Patent No.: US 12,342,194 B2
(45) Date of Patent: Jun. 24, 2025

(54) CLASSIFYING LINKS ESTABLISHED BETWEEN A USER EQUIPMENT AND A NETWORK NODE VIA A RECONFIGURABLE INTELLIGENT SURFACE

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 17/822,247

(22) Filed: Aug. 25, 2022

(65) Prior Publication Data

US 2024/0073712 A1 Feb. 29, 2024

(51) Int. Cl.
| | | |
|---|---|---|
| H04W 24/08 | (2009.01) | |
| H04L 5/00 | (2006.01) | |
| H04W 16/28 | (2009.01) | |
| H04W 24/10 | (2009.01) | |

(52) U.S. Cl.
CPC ............ *H04W 24/08* (2013.01); *H04L 5/005* (2013.01); *H04W 16/28* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2018/0102827 A1* | 4/2018 | Noh | H04W 72/51 |
| 2023/0232290 A1* | 7/2023 | Cui | H04B 7/06966 |
| | | | 370/331 |
| 2023/0379735 A1* | 11/2023 | Bi | H04B 7/0695 |

FOREIGN PATENT DOCUMENTS

WO WO-2017196612 A1 11/2017

OTHER PUBLICATIONS

Partial International Search Report—PCT/US2023/072561—ISA/EPO—Dec. 4, 2023.
International Search Report and Written Opinion—PCT/US2023/072561—ISA/EPO—Jan. 25, 2024.

* cited by examiner

*Primary Examiner* — Anh Ngoc M Nguyen
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a classification of a link established between the UE and a network node. The classification may indicate whether the link is associated with a reciprocity. The reciprocity may include a beam correspondence and channel reciprocity. The classification of the link may be a binary classification. The classification of the link may be based at least in part on a metric associated with the link. The link may be associated with the reciprocity depending on one or more link characteristics associated with the link. Numerous other aspects are described.

30 Claims, 12 Drawing Sheets

800

810 Transmit, to a user equipment (UE), an indication of a classification of a link established between the network node and the UE via an RIS, wherein the classification indicates whether the link is associated with a reciprocity, and wherein the reciprocity includes a beam correspondence and channel reciprocity via the RIS

FIG. 8

CLASSIFYING LINKS ESTABLISHED BETWEEN A USER EQUIPMENT AND A NETWORK NODE VIA A RECONFIGURABLE INTELLIGENT SURFACE

FIELD OF THE DISCLOSURE

Aspects of the present disclosure generally relate to wireless communication and to techniques and apparatuses for classifying links established between a user equipment (UE) and a network node via a reconfigurable intelligent surface (RIS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

A reconfigurable intelligent surface (RIS) may receive a signal from a user equipment (UE) and reflect the signal to a network node. The RIS may receive the signal and reflect the signal in a first direction. Alternatively, the RIS may receive a signal from the network node and reflect the signal to the UE. The RIS may receive the signal and reflect the signal in a second direction. In some cases, a channel associated with the first direction may not correspond to a channel associated with the second direction. In other words, the channels may be non-reciprocal. The non-reciprocity of the RIS may impact a beam correspondence and reciprocity-based channel sounding. Further, the UE may perform various tasks based at least in part on an assumption of reciprocity, and when channels in different directions are actually non-reciprocal, a performance of the UE may be negatively affected.

In various aspects of techniques and apparatuses described herein, the UE may determine a classification of a link established between the UE and the network node via an RIS. The UE may determine the classification of the link based at least in part on a bi-directional sounding procedure. The classification may indicate whether the link is associated with a reciprocity. The reciprocity may include a beam correspondence and channel reciprocity via the RIS. The UE may transmit, to the network node or to another UE, an indication of the classification of the link. The UE may perform an action based at least in part on the classification of the link. For example, depending on whether or not the link is associated with the reciprocity, the UE may use reference signals associated with the link.

In some implementations, an apparatus for wireless communication at the UE includes a memory and one or more processors, coupled to the memory, configured to: transmit an indication of a classification of a link established between the UE and a network node, wherein the classification indicates whether the link is associated with a reciprocity, and wherein the reciprocity includes a beam correspondence and channel reciprocity; and perform an action based at least in part on the classification of the link.

In some implementations, an apparatus for wireless communication at a network node includes a memory and one or more processors, coupled to the memory, configured to transmit, to a UE, an indication of a classification of a link established between the network node and the UE via an RIS, wherein the classification indicates whether the link is associated with a reciprocity, and wherein the reciprocity includes a beam correspondence and channel reciprocity via the RIS.

In some implementations, a method of wireless communication performed by an apparatus of a UE includes transmitting an indication of a classification of a link established between the UE and a network node, wherein the classification indicates whether the link is associated with a reciprocity, and wherein the reciprocity includes a beam correspondence and channel reciprocity; and performing an action based at least in part on the classification of the link.

In some implementations, a method of wireless communication performed by an apparatus of a network node includes transmitting, to a UE, an indication of a classification of a link established between the network node and the UE via an RIS, wherein the classification indicates whether the link is associated with a reciprocity, and wherein the reciprocity includes a beam correspondence and channel reciprocity via the RIS.

In some implementations, a non-transitory computer-readable medium storing a set of instructions for wireless communication includes one or more instructions that, when executed by one or more processors of a UE, cause the UE to: transmit an indication of a classification of a link established between the UE and a network node, wherein the classification indicates whether the link is associated with a reciprocity, and wherein the reciprocity includes a beam correspondence and channel reciprocity; and perform an action based at least in part on the classification of the link.

In some implementations, a non-transitory computer-readable medium storing a set of instructions for wireless communication includes one or more instructions that, when executed by one or more processors of a network node, cause the network node to: transmit, to a UE, an indication of a classification of a link established between the network node and the UE via an RIS, wherein the classification indicates whether the link is associated with a reciprocity, and wherein the reciprocity includes a beam correspondence and channel reciprocity via the RIS.

In some implementations, an apparatus for wireless communication includes means for transmitting an indication of a classification of a link established between the apparatus and a network node, wherein the classification indicates whether the link is associated with a reciprocity, and wherein the reciprocity includes a beam correspondence and channel reciprocity; and means for performing an action based at least in part on the classification of the link.

In some implementations, an apparatus for wireless communication includes means for transmitting, to a UE, an indication of a classification of a link established between the apparatus and the UE via an RIS, wherein the classification indicates whether the link is associated with a reciprocity, and wherein the reciprocity includes a beam correspondence and channel reciprocity via the RIS.

Aspects generally include a method, apparatus, system, computer program product, non-transitory computer-readable medium, user equipment, base station, wireless communication device, network entity, network node, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 7-8 are flowcharts of example methods of wireless communication.

DETAILED DESCRIPTION

Figure 1:
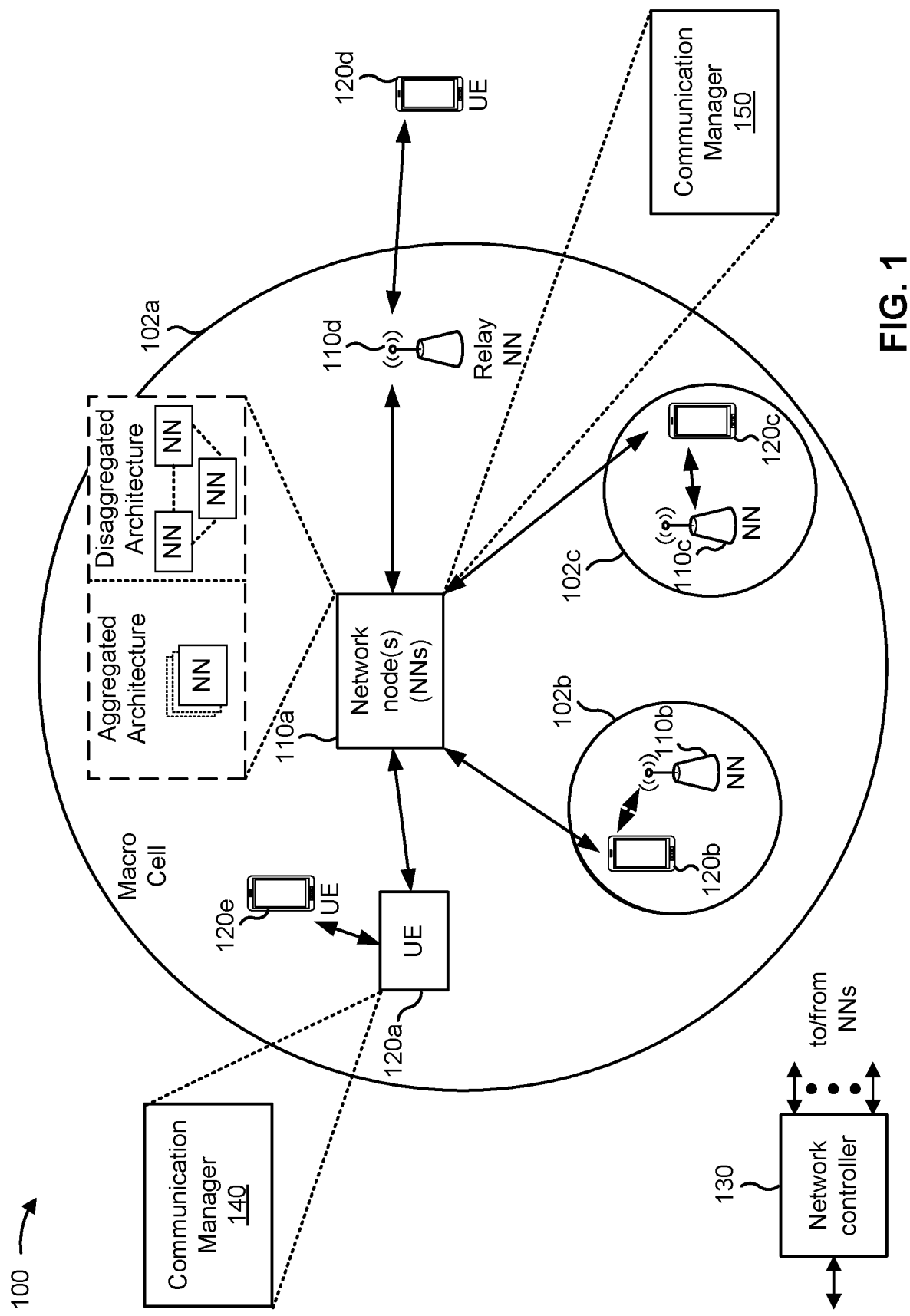
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices.

Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a UE (e.g., UE 120) may include a communication manager 140. As described in more detail elsewhere herein, the communication manager 140 may transmit an indication of a classification of a link established between the UE and a network node, wherein the classification indicates whether the link is associated with a reciprocity, and wherein the reciprocity includes a beam correspondence and channel reciprocity; and perform an action based at least in part on the classification of the link. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, an indication of a classification of a link established between the network node and the UE via a reconfigurable intelligent surface (RIS), wherein the classification indicates whether the link is associated with a reciprocity, and wherein the reciprocity includes a beam correspondence and channel reciprocity via the RIS. Additionally, or alternatively, the communication manager 150 may perform one or more other operations described herein.

As indicated above, FIG. 1 is provided as an example. Other examples may differ from what is described with regard to FIG. 1.

Figure 2:
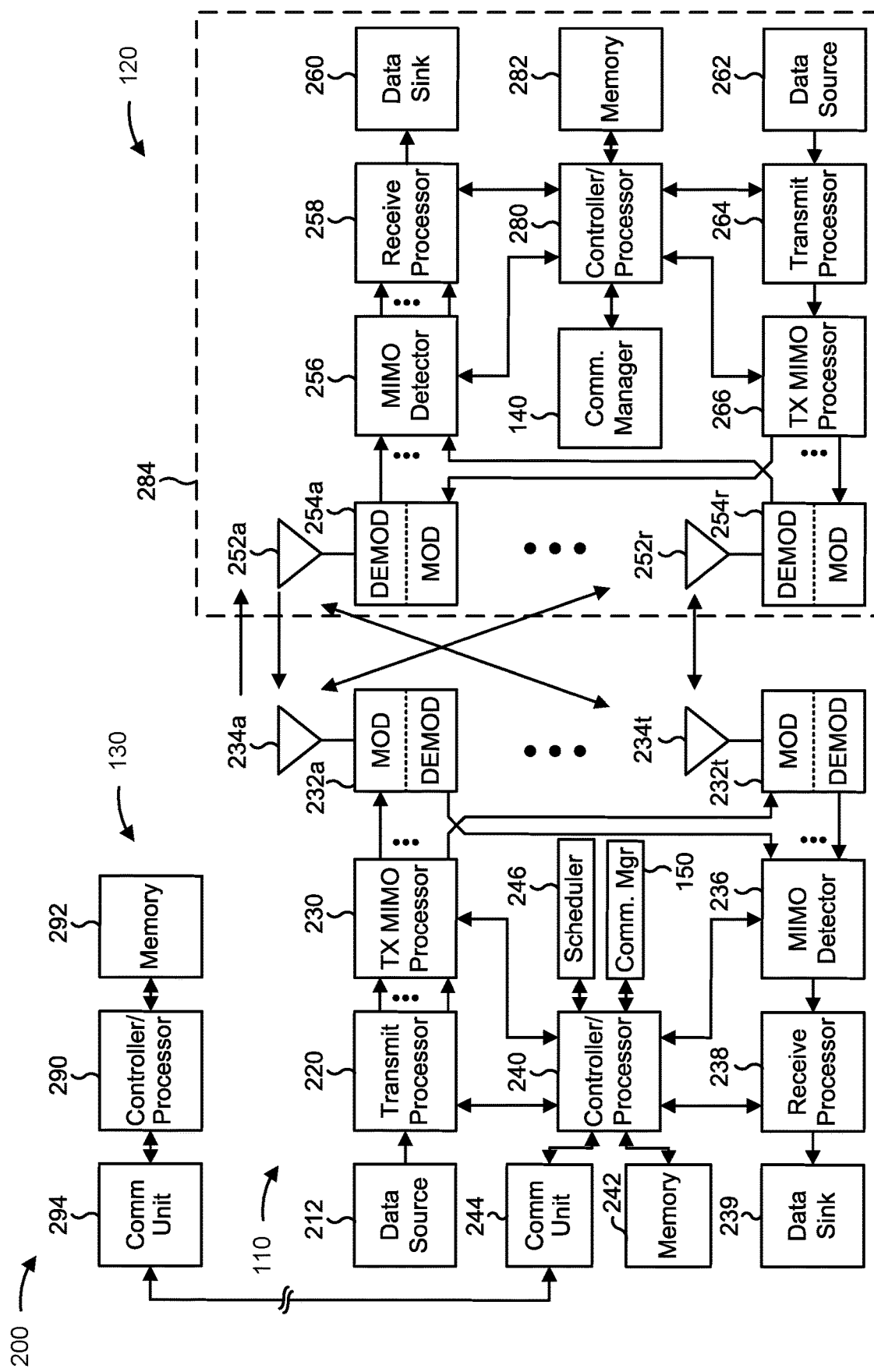
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive (RX) processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

The controller/processor 240 of the network node 110, the controller/processor 280 of the UE 120, and/or any other component(s) of FIG. 2 may perform one or more techniques associated with classifying links established between a UE and a network node via an RIS, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for transmitting an indication of a classification of a link established between the UE and a network node, wherein the classification indicates whether the link is associated with a reciprocity, and wherein the reciprocity includes a beam correspondence and channel reciprocity; and/or means for performing an action based at least in part on the classification of the link. In some aspects, the means for the apparatus to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a UE, an indication of a classification of a link established between the network node and the UE via an RIS, wherein the classification indicates whether the link is associated with a reciprocity, and wherein the reciprocity includes a beam correspondence and channel reciprocity via the RIS. In some aspects, the means for the apparatus to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
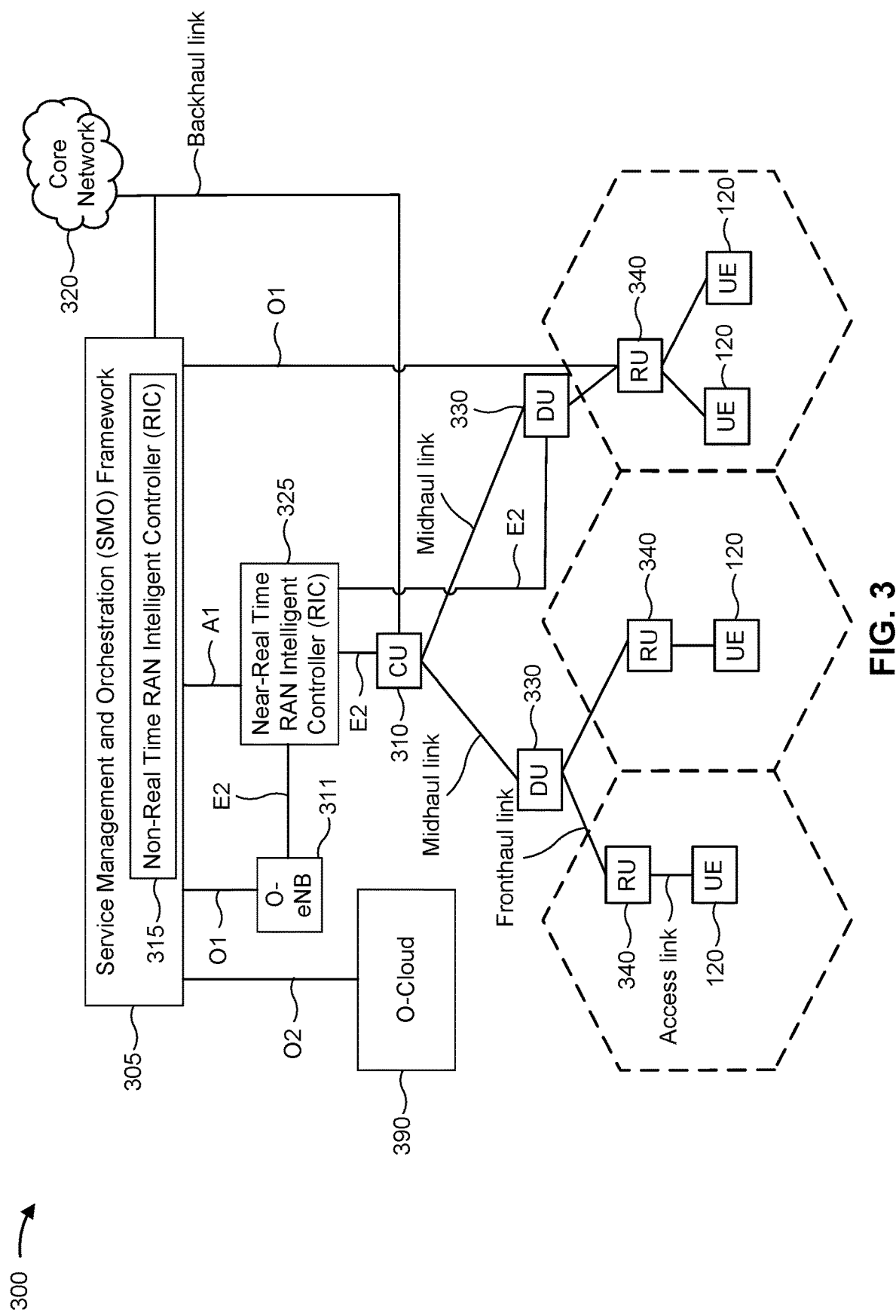
FIG. 3 is a diagram illustrating an example disaggregated base station architecture.

FIG. 3 is a diagram illustrating an example disaggregated base station architecture 300. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML, models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
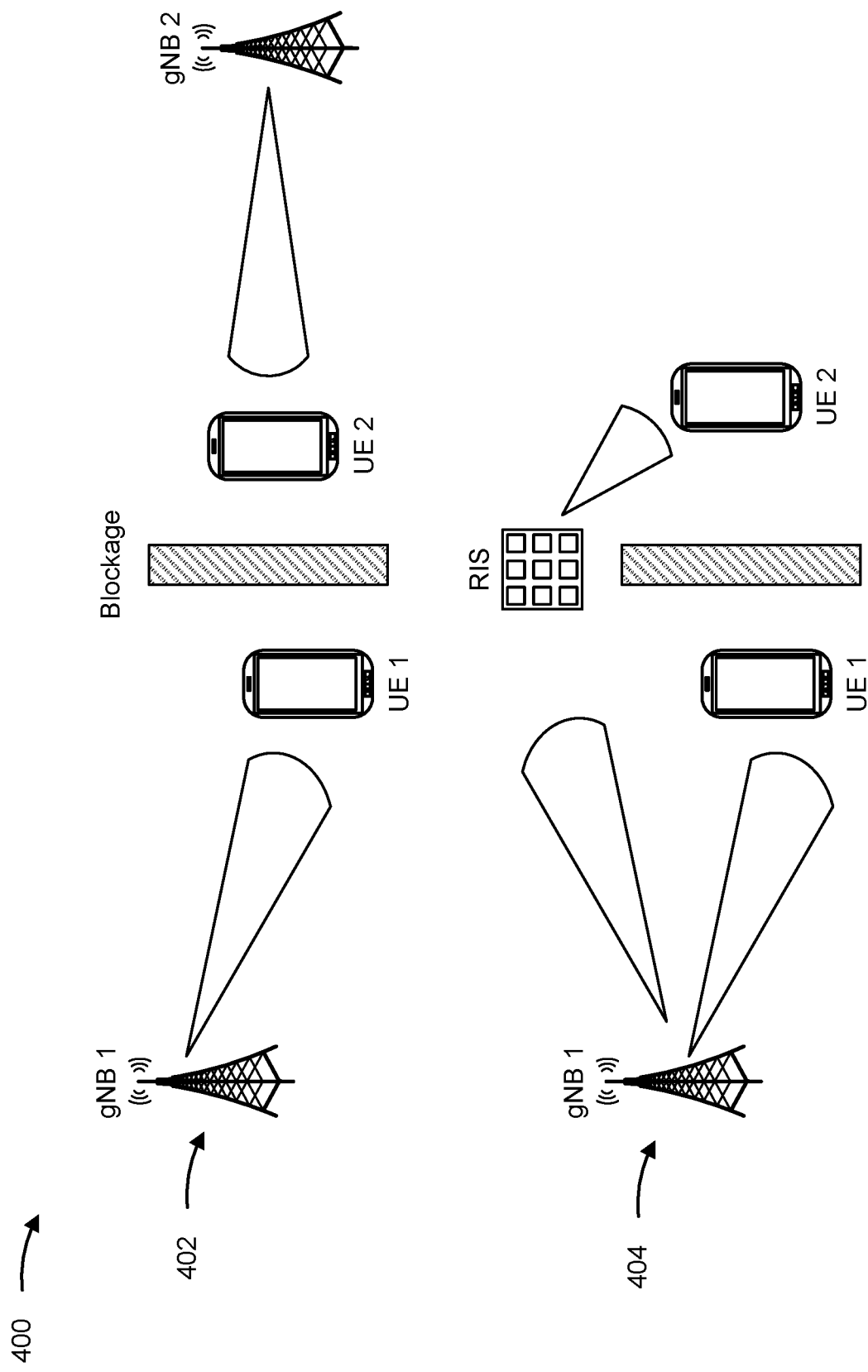
FIG. 4 is a diagram illustrating an example of a reconfigurable intelligent surface (RIS).

FIG. 4 is a diagram illustrating an example 400 of an RIS. At 402, a first network node (gNB1) may transmit a first downlink transmission to a first UE (UE1). A second network node (gNB2) may transmit a second downlink transmission to a second UE (UE2). The first UE and the second UE may be separated by a blockage. As a result, downlink transmissions from the first network node may not be received by the second UE, and downlink transmissions from the second network node may not be received by the first UE. At 404, an RIS may be employed in proximity to the blockage. The first network node may transmit a first downlink transmission to the first UE and a second downlink transmission to the RIS. The RIS may include a plurality of elements that reflect the second downlink transmission in a direction toward the second UE. As a result, the first network node may effectively perform downlink transmissions to the second UE via the RIS, even though the blockage is present between the first network node and the second UE. As indicated above, FIG. 4 is provided as an example. Other examples may differ from what is described with regard to FIG. 4.

Figure 5:
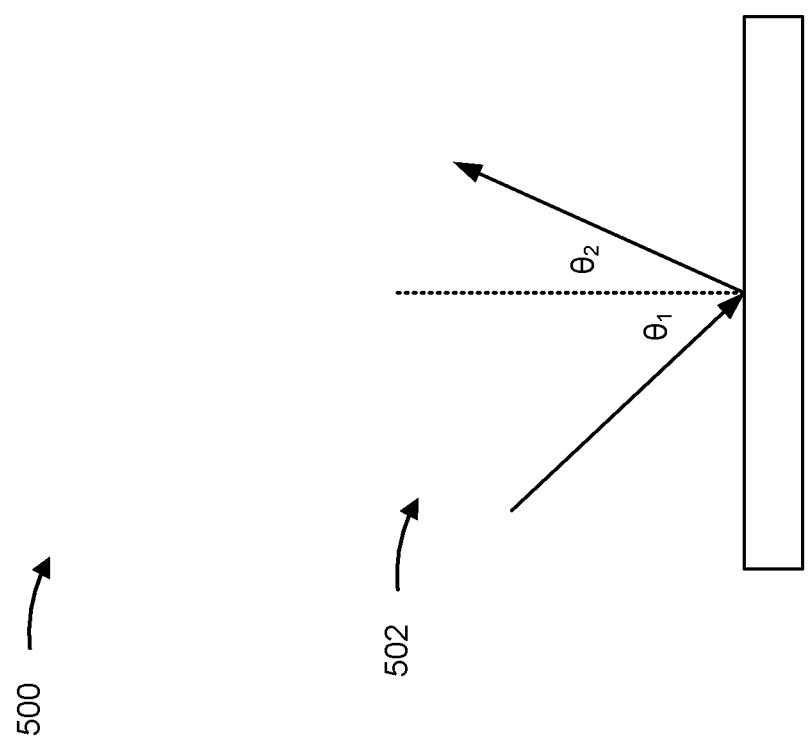
FIG. 5 is a diagram illustrating an example of signals directed to an RIS and signals directed from the RIS.

FIG. 5 is a diagram illustrating an example of signals directed to an RIS and signals directed from the RIS.

At 502, a first signal may be directed to an RIS. The first signal may be associated with a first angle ($\theta_1$), which may correspond to an incident angle. The RIS may direct a second signal, which may be associated with the first signal (e.g., the first signal may be reflected from the RIS as the second signal). The second signal may be associated with a second angle ($\theta_2$), which may correspond to a reflected angle. The first signal and the second signal may be associated with a first direction (or first reflection path).

At 504, a third signal may be directed to the RIS. The third signal may be associated with the second angle ($\theta_2$), which may correspond to an incident angle. The RIS may direct a fourth signal, which may be associated with the third signal (e.g., the third signal may be reflected from the RIS as the fourth signal). The fourth signal may be associated with a third angle ($\theta_3$), which may correspond to a reflected angle. The third signal and the fourth signal may be associated with a second direction (or second reflection path). Even though the second signal and the third signal may both be associated with the same angle (e.g., the second angle ($\theta_2$)), angles associated with corresponding signals may not be the same (e.g., the first angle is different from the third angle). A channel reciprocity and beam correspondence may not hold for a reflection path through the RIS. The channel reciprocity may hold approximately for some range of incident angles but may be limited.

As indicated above, FIG. 5 is provided as an example. Other examples may differ from what is described with regard to FIG. 5.

A UE capability for beam correspondence may be associated with additional signaling. For a strong beam correspondence, a beam correspondence without uplink beam sweeping (beamCorrespondenceWithoutUL-BeamSweeping) value may be set to 1. For a weak beam correspondence, the beamCorrespondenceWithoutUL-BeamSweeping value may be set to 0. In other words, a UE that fulfills a beam correspondence requirement without the uplink sweeping may set a corresponding bit to 1. A UE that fulfills the beam correspondence requirement with the uplink beam sweeping may set the bit to 0. The UE capability for beam correspondence may be based at least in part on a channel reciprocity. Further, a channel reciprocity-based sounding may be employed. For example, a sounding reference signal (SRS) may be used to sound downlink channels (e.g., SRS for antenna switching). A synchronization signal block (SSB) or channel state information reference signal (CSI-RS) may be used to sound an uplink channel (e.g., a non-codebook-based uplink channel).

An assumption of channel reciprocity may be held between a channel associated with a first direction and a channel associated with a second direction. The assumption of channel reciprocity may be held for an RIS, which may be capable of reflecting received signals. However, depending on an incident angle associated with a received signal, a non-channel-reciprocity may be present, such that a channel reciprocity and beam correspondence may not hold for a reflection path through the RIS. Due to the non-channel-reciprocity of the RIS, the channel associated with the first direction may have different characteristics as compared to the channel associated with the second direction. The non-channel-reciprocity of the RIS may impact the beam correspondence and reciprocity-based channel sounding.

In various aspects of techniques and apparatuses described herein, a UE may determine a classification of a link established between the UE and a network node via an RIS. The UE may determine the classification of the link based at least in part on a bi-directional sounding procedure. The classification may indicate whether the link is associated with a reciprocity. The reciprocity may include a beam correspondence and channel reciprocity via the RIS. The UE may transmit, to the network node or to another UE, an indication of the classification of the link. The UE may perform an action based at least in part on the classification of the link. For example, depending on whether or not the link is associated with the reciprocity, the UE may use reference signals associated with the link. The UE may use a reference signal associated with a link that has reciprocity, whereas the UE may not use a reference signal associated with a link that does not have reciprocity. In other words, due to a non-channel-reciprocity of the RIS, a special handling for beam correspondence and reciprocity-based channel sounding may be utilized by the UE and the network, thereby improving a performance of the UE and the network.

In some aspects, beams for a direct path (e.g., a network-node-to-UE path) and beams for a reflected path (e.g., a network-node-to-RIS-to-UE) path may be distinguished and handled separately (e.g., classified separately) because the beams associated with the direct path are more likely to be associated with the reciprocity and beams associated with the reflected path are more likely to not be associated with the reciprocity.

Figure 6:
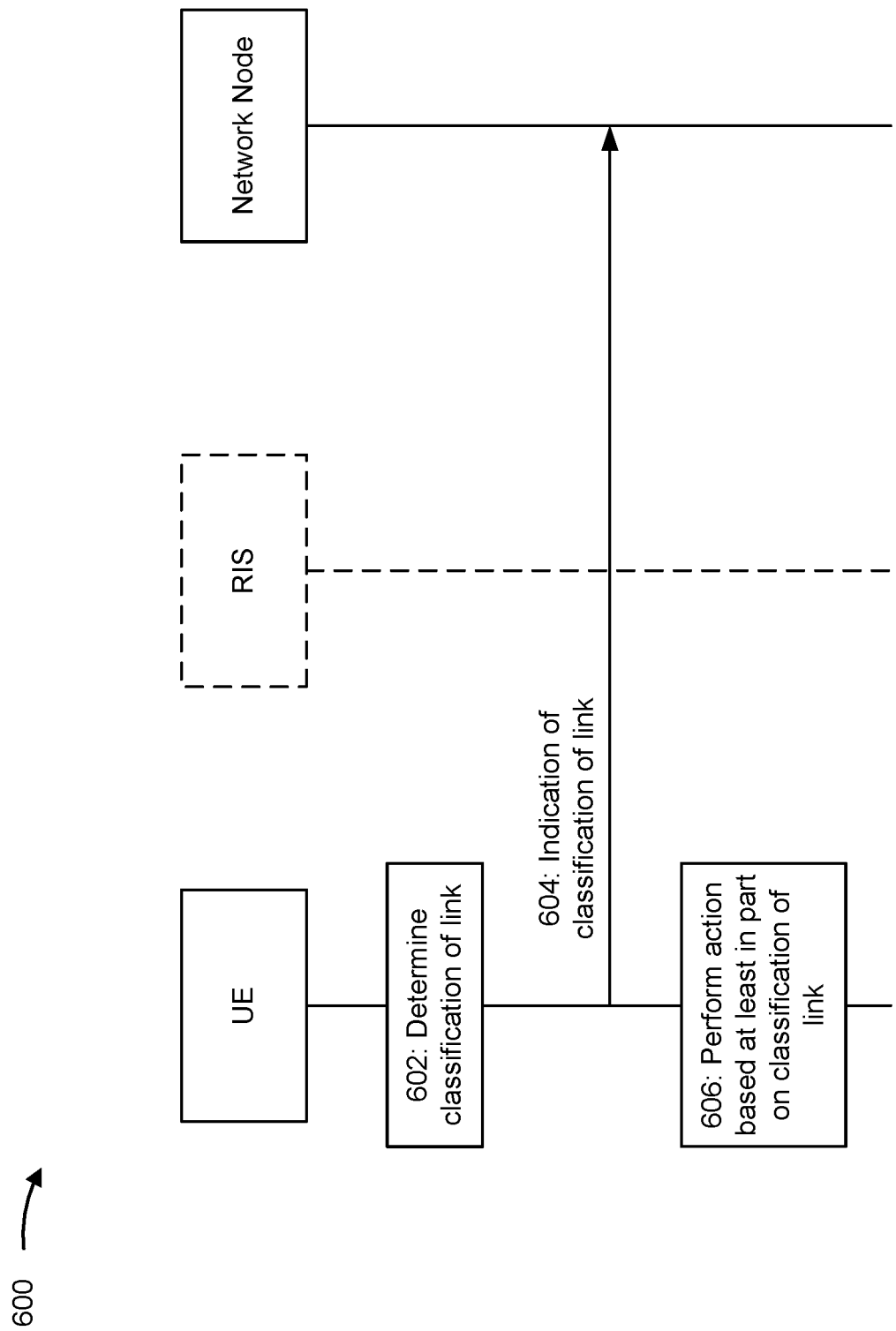
FIG. 6 is a diagram illustrating an example associated with classifying links established between a UE and a network node via an RIS.

FIG. 6 is a diagram illustrating an example 600 associated with classifying links established between a UE and a network node via an RIS. As shown in FIG. 6, example 600 includes communication between a UE (e.g., UE 120) and a network node (e.g., network node 110). In some aspects, the UE and the network node may be included in a wireless network, such as wireless network 100.

At 602, the UE may determine a classification of a link established between the UE and the network node via an RIS. The classification may indicate whether the link is associated with a reciprocity. The reciprocity may include a beam correspondence and channel reciprocity via the RIS. In some aspects, the classification of the link may be a binary classification, where a first classification may be associated with the link being associated with the reciprocity, and a second classification may be associated with the link not being associated with the reciprocity. In some aspects, the classification of the link may be based at least in part on a metric associated with the link. The link may be associated with the reciprocity based at least in part on the metric satisfying a threshold. The link may not be associated with the reciprocity based at least in part on the metric not satisfying the threshold. The threshold may be based at least in part on a network node implementation, a network node capability, a UE implementation, and/or a UE capability.

In some aspects, the link may be associated with the reciprocity depending on one or more link characteristics associated with the link. The one or more link characteristics may be associated with a path between the UE and the network node. The path may be a direct path between the UE and the network node, and/or a reflected path between the UE and the network via the RIS. The reciprocity may be a function of a weight of each path based at least in part on the link being associated with a combination of direct paths and reflected paths. The one or more link characteristics may be associated with an incident angle of a signal directed to the RIS, and/or a reflected angle of a signal reflected from the RIS.

In some aspects, the UE may determine the classification of the link based at least in part on a bi-directional sounding procedure. The UE may determine the classification of the link based at least in part on a comparison between a reported channel state information (CSI) associated with a downlink CSI-RS and a measured CSI associated with an uplink SRS. In other words, the UE may compare the reported CSI and the measured CSI, and based at least in part on a result of the comparison, the UE may determine the classification of the link. Alternatively, or additionally, the network node may determine the classification of the link based at least in part on the bi-directional sounding procedure (e.g., by comparing the reported CSI and the measured CSI). In some aspects, the classification of the link may be defined by an operator during an initial deployment of the network node and the RIS, where the reciprocity may be associated with an SSB beam.

In some aspects, based at least in part on a link classification, the UE and/or the network node may classify each link (e.g., a beam paired link) established between the network node and the UE based at least in part on the reciprocity associated with the link. The link may be a communication link. The reciprocity may be associated with the beam correspondence and the channel reciprocity. The link classification may be the binary classification (e g, links with the reciprocity versus links without the reciprocity). Alternatively, the UE and/or the network node may determine the metric (e.g., soft metric) of reciprocity for each link. The UE and/or the network node may compare the metric to the threshold. For example, when the metric satisfies the threshold (e.g., the metric is higher than the threshold), a given link may be classified as being reciprocal. When the metric does not satisfy the threshold (e.g., the metric is lower than the threshold), a given link may be classified as being not reciprocal. The threshold may be based at least in part on the network node and/or UE implementation or capability.

In some aspects, the link classification of the reciprocity may depend on the link characteristics associated with the link. The link classification of the reciprocity may depend on whether the link is associated with the direct path (e.g., network-node-to-UE path) or the reflected path (e.g., a base-station-to-RIS-to-UE path). When the link is a mixture of direct and reflected paths, the reciprocity associated with the link may be the function of the weight of each direct path and reflected path. In some aspects, the link classification of the reciprocity may depend on incident angles and reflected angles to and from the RIS, respectively. A better reciprocity may be expected for paths with smaller incident/reflected angles (e.g., incident/reflected angles that are less than a threshold).

In some aspects, the UE and/or the network node may classify (or identify) the reciprocity associated with links established between the network node and the UE. The UE and/or the network node may estimate an extent of reciprocity of each link via bi-directional sounding procedures. For example, the network node may compare CSI reported from the UE (e.g., CSI measured based at least in part on a downlink CSI-RS) and CSI measured by the network node (e.g., CSI measured based at least in part on an uplink SRS). Alternatively, during the initial deployment of the network node and the RIS, the operator may classify (or identify or characterize) the reciprocity of each beam (e.g., SSB beams). Further, reciprocity information of each link may be shared between the UE and the network node via downlink and uplink signaling.

At 604, the UE may transmit, to the network node or to another UE, an indication of the classification of the link established between the UE and the network node via the RIS. The UE may transmit the indication to the network node via the RIS. In some aspects, the UE may transmit, to the network node, a CSI report that indicates the reciprocity of the link associated with a reported CSI-RS resource indicator (CRI) or SSB resource indicator (SSBRI).

In some aspects, the UE may transmit, to the network node, a UE beam correspondence capability indicating that the UE fulfills a beam correspondence requirement without an uplink beam sweeping. The UE beam correspondence capability may be observed based at least in part on the link being associated with the reciprocity. The UE beam correspondence capability may not be observed based at least in part on the link not being associated with the reciprocity. In other words, the UE beam correspondence capability may be ignored when the link is not associated with the reciprocity.

At 606, the UE may perform an action based at least in part on the classification of the link. In some aspects, the UE may receive, from the network node and via a link that is not associated with the reciprocity, an SSB or CSI-RS. The UE, when performing the action, may prevent the SSB or CSI-RS from being used as spatial relation information or as an associated CSI-RS. The UE may not use or may refrain from using the SSB or CSI-RS as spatial relation information or as the associated CSI-RS. Alternatively, the UE, when performing the action, may prevent the SSB or CSI-RS from being used as a pathloss reference signal for an uplink transmission. The UE may not use or may refrain from using the SSB or CSI-RS as the pathloss reference signal for the uplink transmission. In some aspects, the UE may receive, from the network node and via a link that is not associated with the reciprocity, a positioning reference signal (PRS) or an SRS for positioning. The UE, when performing the action, may prevent the PRS or the SRS for positioning from being used for positioning, where the positioning may include a round-trip-time (RTT)-based positioning. The UE may not use or may refrain from using the PRS or the SRS for positioning. In some aspects, the UE may receive via the link that is not associated with the reciprocity, a reference signal (e.g., an SRS). The UE, when performing the action, may prevent the reference signal from being used for a bidirectional cross-link interference (CLI) measurement. The UE may not use or may refrain from using the reference signal for the bidirectional CLI measurement. The bidirectional CLI measurement may be between the UE and another UE.

In some aspects, the UE may select a sensing beam based at least in part on whether a transmit beam is associated with the reciprocity. The sensing beam may correspond to the transmit beam based at least in part on the transmit beam being associated with the reciprocity. The sensing beam may be a wide beam (e.g., a beam with a spatially wide width) as compared to the transmit beam based at least in part on the transmit beam not being associated with the reciprocity.

In some aspects, the UE and/or the network node may perform a per-beam reciprocity handling. In some aspects, with respect to CSI, the UE may report the reciprocity associated with each CRI or SSBRI via CSI reporting. A reported reciprocity may indicate a binary classification (e.g., a given reported CRI/SSBRI is reciprocal or not reciprocal), or the reported reciprocity may indicate a metric of reciprocity. In some aspects, with respect to a beam correspondence assumption, regardless of the UE's beam correspondence capability, beam correspondence may not be assumed for some links. For example, even when the UE reports beamCorrespondenceWithoutUL-BeamSweeping=1, a capability may hold only for a link with a relatively high reciprocity metric. Further, the UE may assume that beamCorrespondenceWithoutUL-BeamSweeping is 0 for links with relatively low reciprocity metrics.

In some aspects, with respect to an SRS configuration, an SSB/CSI-RS associated with a relatively low reciprocity beam/link may be prevented from being used as spatial relation information (e.g., for an SRS for antenna switching) or as an associated CSI-RS (e.g., a non-codebook-based uplink). In some aspects, with respect to an uplink power control, an SSB/CSI-RS associated with a relatively low reciprocity beam/link may be prevented from being used as a pathloss reference signal for an uplink transmission, such as a physical uplink control channel (PUCCH) transmission, a physical uplink shared channel (PUSCH) transmission, or an SRS transmission.

In some aspects, a PRS and an SRS (for positioning) associated with a relatively low reciprocity beam/link may be prevented from being used for positioning, including RTT-based positioning. In some aspects, with respect to a CLI measurement (e.g., for full-duplex operation), a reference signal (e.g., an SRS) associated with a relatively low reciprocity beam/link may be prevented from being used for a bidirectional CLI measurement. Interference from a second UE to a first UE may be different than interference from the first UE to the second UE. As such, an individual unidirectional CLI measurement may be used for each UE. In some aspects, with respect to an unlicensed band operation, the UE may report that beamCorrespondenceWithoutUL-BeamSweeping=1. A sensing beam selection may depend on whether or not the transmit beam retains reciprocity. For a transmit beam with a relatively high reciprocity beam/link (e.g., corresponding to the direct path), a sensing beam may be the same as the transmit beam. For a transmit beam with a relatively low reciprocity beam/link (e.g., corresponding to the reflected path from the RIS), a wider beam (e.g., a pseudo-omni beam) than the transmit beam may be used for sensing.

As indicated above, FIG. 6 is provided as an example. Other examples may differ from what is described with regard to FIG. 6.

Figure 7:
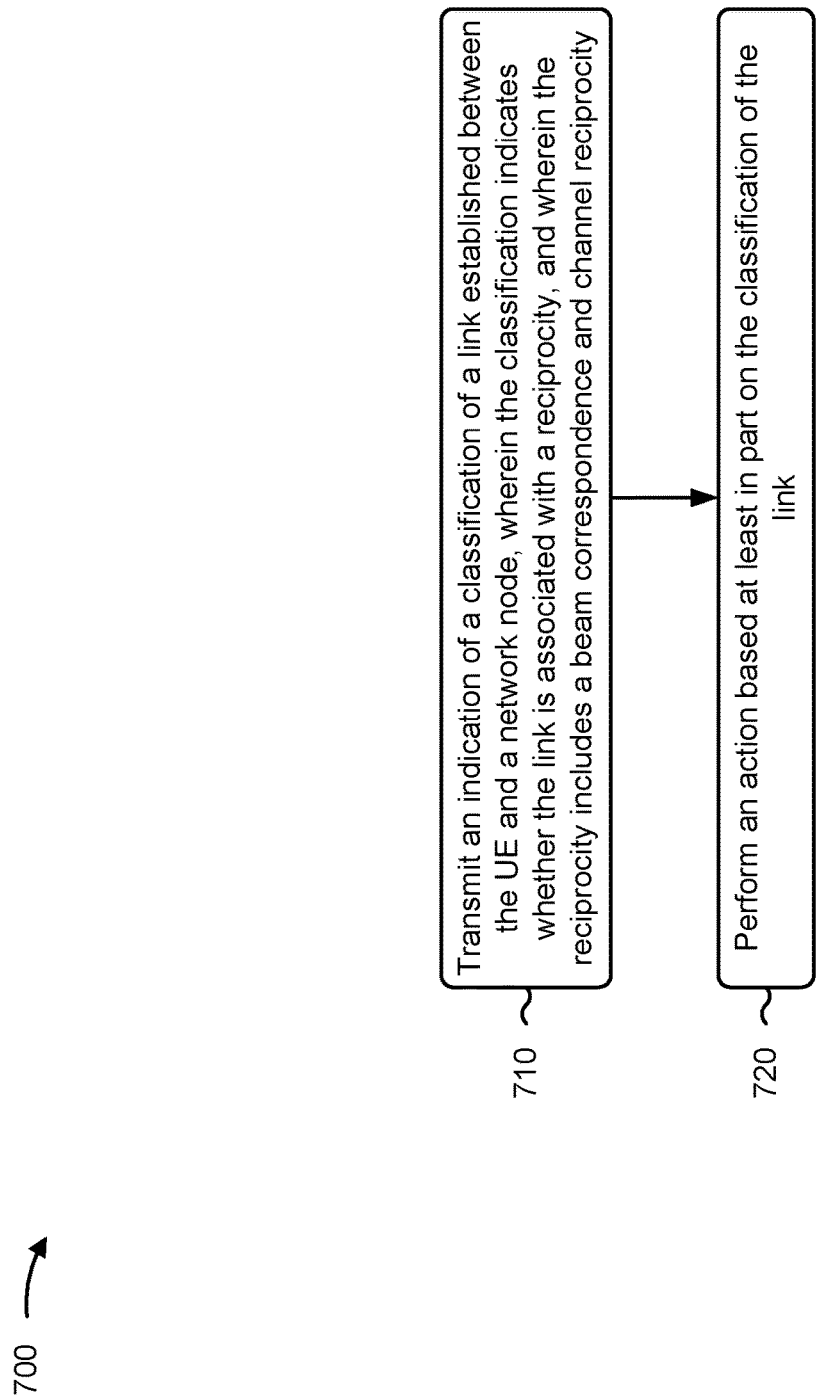

FIG. 7 is a flowchart of an example method 700 of wireless communication. The method 700 may be performed by, for example, UE (e.g., UE 120).

At 710, the UE may transmit an indication of a classification of a link established between the UE and a network node, wherein the classification indicates whether the link is associated with a reciprocity, and wherein the reciprocity includes a beam correspondence and channel reciprocity. For example, the UE (e.g., using communication manager 140 and/or transmission component 904, depicted in FIG. 9) may transmit an indication of a classification of a link established between the UE and a network node, wherein the classification indicates whether the link is associated with a reciprocity, and wherein the reciprocity includes a beam correspondence and channel reciprocity, as described above in connection with, for example, FIG. 6 and at 604.

In some aspects, the classification of the link is a binary classification, wherein a first classification is associated with the link being associated with the reciprocity, and a second classification is associated with the link not being associated with the reciprocity. In some aspects, the classification of the link is based at least in part on a metric associated with the link, wherein the link is associated with the reciprocity based at least in part on the metric satisfying a threshold, and the link is not associated with the reciprocity based at least in part on the metric not satisfying the threshold, and wherein the threshold is based at least in part on one or more of a network node implementation, a network node capability, a UE implementation, or a UE capability.

In some aspects, the link is associated with the reciprocity depending on one or more link characteristics associated with the link. In some aspects, the one or more link characteristics are associated with a path between the UE and the network node, wherein the path is one or more of a direct path between the UE and the network node, or a reflected path between the UE and the network via the RIS, and the reciprocity is a function of a weight of each path based at least in part on the link being associated with a combination of direct paths and reflected paths, or the one or more link characteristics are associated with one or more of an incident angle of a signal directed to the RIS, or a reflected angle of a signal reflected from the RIS.

In some aspects, the classification of the link is based at least in part on a bi-directional sounding procedure, wherein the classification of the link is determined based at least in part on a comparison between a reported CSI associated with a downlink CSI-RS and a measured CSI associated with an uplink SRS. In some aspects, the classification of the link is defined by an operator during an initial deployment of the network node and the RIS, and the reciprocity is associated with an SSB beam.

At 720, the UE may perform an action based at least in part on the classification of the link. For example, the UE (e.g., using communication manager 140 and/or action component 908, depicted in FIG. 9) may perform an action based at least in part on the classification of the link, as described above in connection with, for example, FIG. 6 and at 606.

In some aspects, method 700 includes transmitting, to the network node, a CSI report that indicates the reciprocity of the link associated with a reported CRI or SSBRI. In some aspects, method 700 includes transmitting, to the network node, a UE beam correspondence capability indicating that the UE fulfills a beam correspondence requirement without an uplink beam sweeping, wherein the UE beam correspondence capability is observed based at least in part on the link being associated with the reciprocity, or the UE beam correspondence capability is not observed based at least in part on the link not being associated with the reciprocity. In some aspects, method 700 includes receiving, from the network node and via the link that is not associated with the reciprocity, an SSB or CSI-RS, and performing the action includes preventing the SSB or CSI-RS from being used as spatial relation information or as an associated CSI-RS, or preventing the SSB or CSI-RS from being used as a pathloss reference signal for an uplink transmission.

In some aspects, method 700 includes receiving, from the network node and via the link that is not associated with the reciprocity, a PRS or an SRS for positioning, and performing the action includes preventing the PRS or the SRS for positioning from being used for positioning, and the positioning includes an RTT-based positioning. In some aspects, method 700 includes receiving, via the link that is not associated with the reciprocity, a reference signal, wherein the reference signal is an SRS, and performing the action includes preventing the reference signal from being used for a bidirectional CLI measurement. In some aspects, method 700 includes selecting a sensing beam based at least in part on whether a transmit beam is associated with the reciprocity, wherein the sensing beam corresponds to the transmit beam based at least in part on the transmit beam being associated with the reciprocity, or the sensing beam is a wide beam as compared to the transmit beam based at least in part on the transmit beam not being associated with the reciprocity.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

FIG. 8 is a flowchart of an example method 800 of wireless communication. The method 800 may be performed by, for example, a network node (e.g., network node 110).

At 810, the network node may transmit, to a UE, an indication of a classification of a link established between the network node and the UE via an RIS, wherein the classification indicates whether the link is associated with a reciprocity, and wherein the reciprocity includes a beam correspondence and channel reciprocity via the RIS. For example, the network node (e.g., using transmission component 1104, depicted in FIG. 11) may transmit, to a UE, an indication of a classification of a link established between the network node and the UE via an RIS, wherein the classification indicates whether the link is associated with a reciprocity, and wherein the reciprocity includes a beam correspondence and channel reciprocity via the RIS, as described above in connection with, for example, FIG. 6 and at 604. In some aspects, the classification of the link is based at least in part on a bi-directional sounding procedure, wherein the classification of the link is determined based at least in part on a comparison between a reported CSI associated with a downlink CSI-RS and a measured CSI associated with an uplink SRS.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
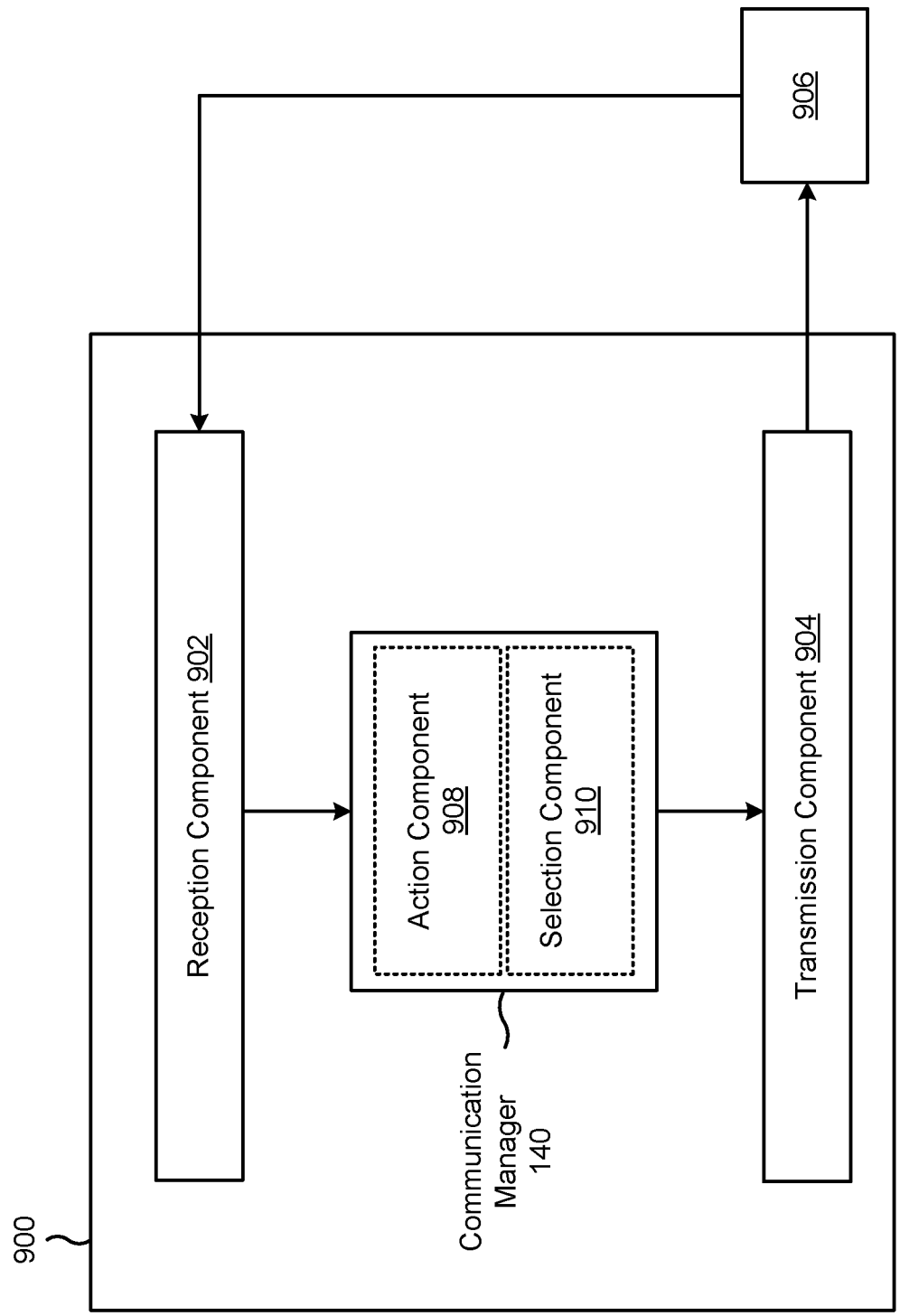
FIG. 9 is a diagram of an example apparatus for wireless communication.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an action component 908, or a selection component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit an indication of a classification of a link established between the UE and a network node, wherein the classification indicates whether the link is associated with a reciprocity, and wherein the reciprocity includes a beam correspondence and channel reciprocity. The action component 908 may perform an action based at least in part on the classification of the link.

The transmission component 904 may transmit, to a network node, a CSI report that indicates the reciprocity of the link associated with a reported CRI or SSBRI. The transmission component 904 may transmit, to a network node, a UE beam correspondence capability indicating that the UE fulfills a beam correspondence requirement without an uplink beam sweeping, wherein the UE beam correspondence capability is observed based at least in part on the link being associated with the reciprocity, or the UE beam correspondence capability is not observed based at least in part on the link not being associated with the reciprocity.

The reception component 902 may receive, from a network node and via the link that is not associated with the reciprocity, an SSB or CSI-RS. The action component 908 may prevent the SSB or CSI-RS from being used as spatial relation information or as an associated CSI-RS, or prevent the SSB or CSI-RS from being used as a pathloss reference signal for an uplink transmission. The reception component 902 may receive, via the link that is not associated with the reciprocity, a PRS or an SRS for positioning. The action component 908 may prevent the PRS or the SRS for positioning from being used for positioning. The reception component 902 may receive, from a network node and via the link that is not associated with the reciprocity, a reference signal. The action component 908 may prevent the reference signal from being used for a bidirectional CLI measurement.

The selection component 910 may select a sensing beam based at least in part on whether a transmit beam is associated with the reciprocity, wherein the sensing beam corresponds to the transmit beam based at least in part on the transmit beam being associated with the reciprocity, or the sensing beam is a wide beam as compared to the transmit beam based at least in part on the transmit beam not being associated with the reciprocity.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
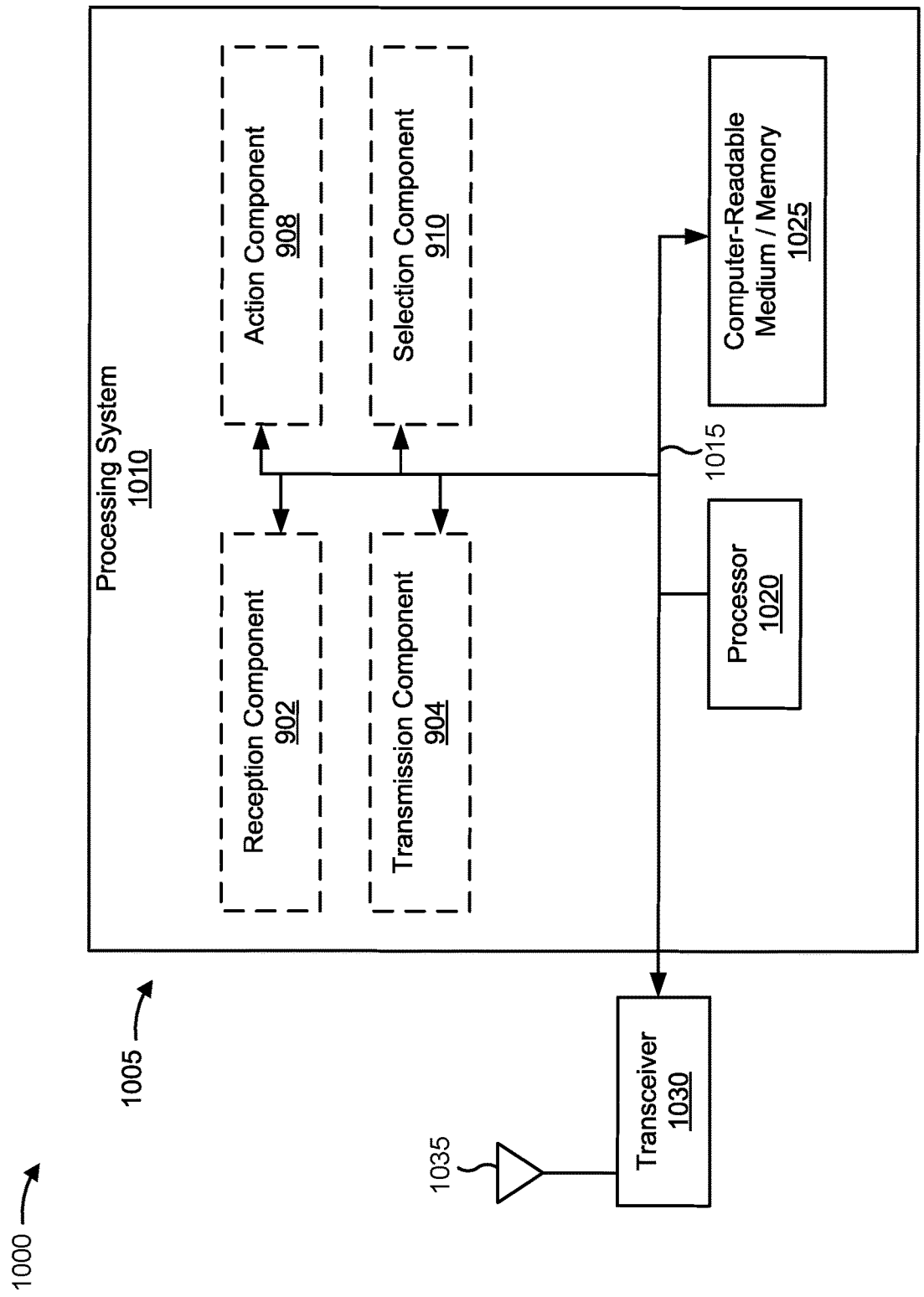
FIG. 10 is a diagram illustrating an example of a hardware implementation for an apparatus employing a processing system.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, and/or power management circuits.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902. In addition, the transceiver 1030 receives information from the processing system 1010, specifically the transmission component 904, and generates a signal to be applied to the one or more antennas 1035 based at least in part on the received information.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for transmitting, to a network node, an indication of a classification of a link established between the UE and the network node via an RIS, wherein the classification indicates whether the link is associated with a reciprocity, and wherein the reciprocity includes a beam correspondence and channel reciprocity via the RIS; and means for performing an action based at least in part on the classification of the link. The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
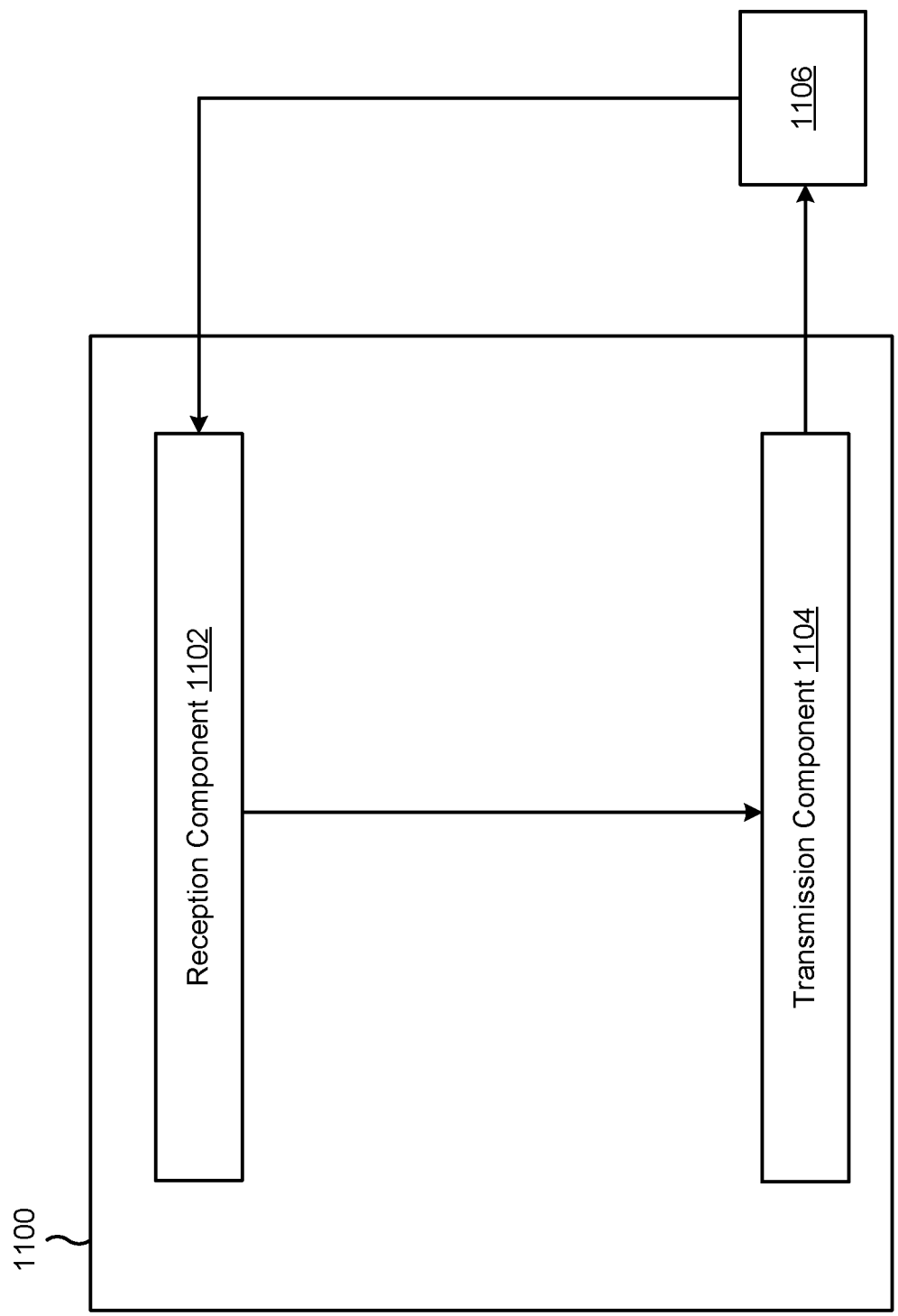
FIG. 11 is a diagram of an example apparatus for wireless communication.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 6. Additionally, or alternatively, the apparatus 1100 may be configured to perform one or more processes described herein, such as process 800 of FIG. 8. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, to a UE, an indication of a classification of a link established between the network node and the UE via an RIS, wherein the classification indicates whether the link is associated with a reciprocity, and wherein the reciprocity includes a beam correspondence and channel reciprocity via the RIS.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
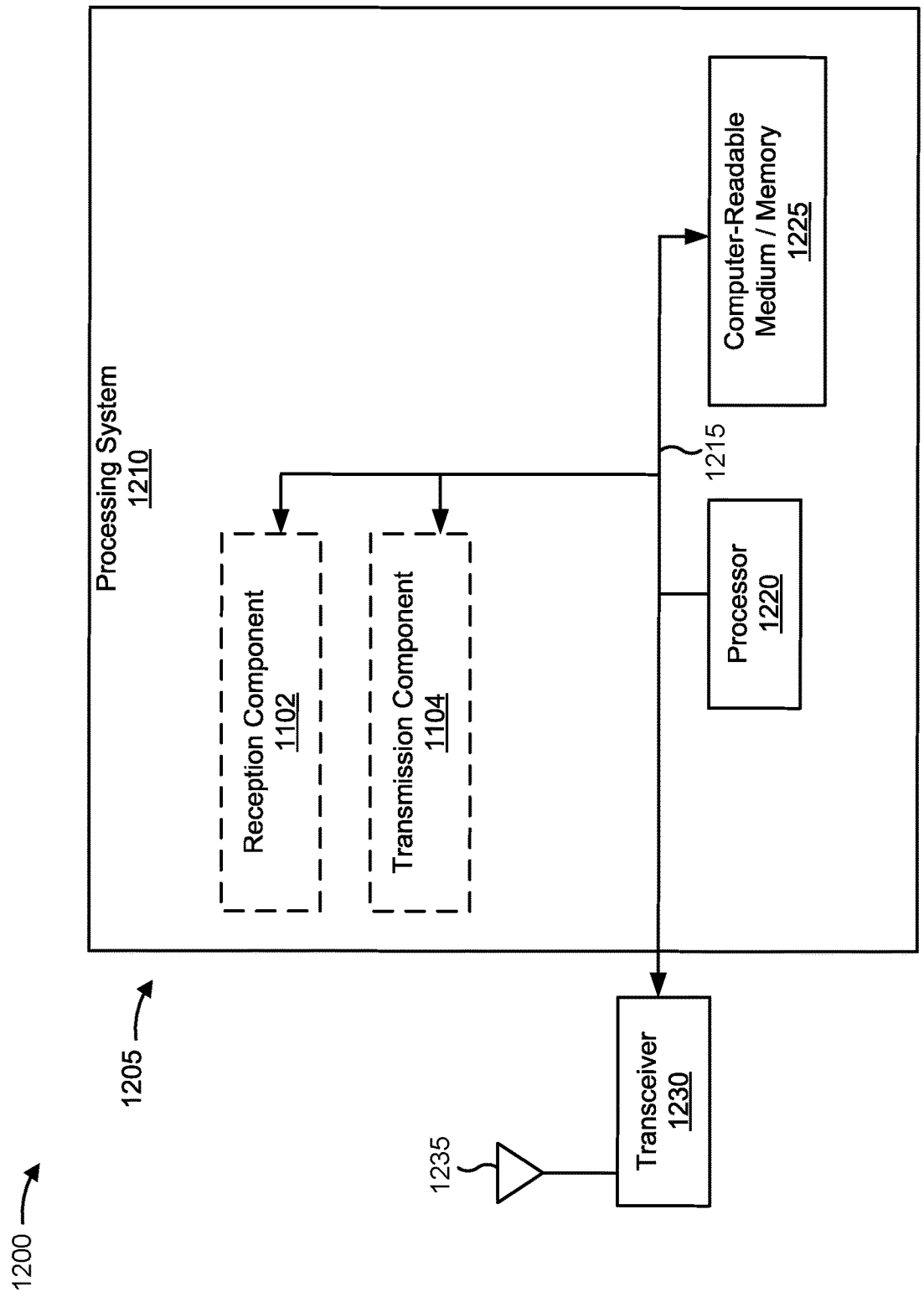
FIG. 12 is a diagram illustrating an example of a hardware implementation for an apparatus employing a processing system.

FIG. 12 is a diagram illustrating an example 1200 of a hardware implementation for an apparatus 1205 employing a processing system 1210. The apparatus 1205 may be a network node.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, and/or power management circuits.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, one or more hardware modules coupled to the processor 1220, or some combination thereof.

In some aspects, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes means for transmitting, to a UE, an indication of a classification of a link established between the network node and the UE via an RIS, wherein the classification indicates whether the link is associated with a reciprocity, and wherein the reciprocity includes a beam correspondence and channel reciprocity via the RIS. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by an apparatus of a user equipment (UE), comprising: transmitting an indication of a classification of a link established between the UE and a network node, wherein the classification indicates whether the link is associated with a reciprocity, and wherein the reciprocity includes a beam correspondence and channel reciprocity; and performing an action based at least in part on the classification of the link.

Aspect 2: The method of Aspect 1, wherein the classification of the link is a binary classification, wherein a first classification is associated with the link being associated with the reciprocity, and a second classification is associated with the link not being associated with the reciprocity.

Aspect 3: The method of any of Aspects 1 through 2, wherein the classification of the link is based at least in part on a metric associated with the link, wherein the link is associated with the reciprocity based at least in part on the metric satisfying a threshold, and the link is not associated with the reciprocity based at least in part on the metric not satisfying the threshold, and wherein the threshold is based at least in part on one or more of: a network node implementation, a network node capability, a UE implementation, or a UE capability.

Aspect 4: The method of any of Aspects 1 through 3, wherein the link is associated with the reciprocity depending on one or more link characteristics associated with the link.

Aspect 5: The method of Aspect 4, wherein: the one or more link characteristics are associated with a path between the UE and a network node, wherein the path is one or more of: a direct path between the UE and the network node, or a reflected path between the UE and the network node via a reconfigurable intelligent surface (RIS), and wherein the reciprocity is a function of a weight of each path based at least in part on the link being associated with a combination of direct paths and reflected paths; or the one or more link characteristics are associated with one or more of: an incident angle of a signal directed to the RIS, or a reflected angle of a signal reflected from the RIS.

Aspect 6: The method of any of Aspects 1 through 5, wherein the classification of the link is based at least in part on a bi-directional sounding procedure, wherein the classification of the link is determined based at least in part on a comparison between a reported channel state information (CSI) associated with a downlink channel state information reference signal and a measured CSI associated with an uplink sounding reference signal.

Aspect 7: The method of any of Aspects 1 through 6, wherein the classification of the link is defined by an operator during an initial deployment of a network node and a reconfigurable intelligent surface (RIS), and wherein the reciprocity is associated with a synchronization signal block beam.

Aspect 8: The method of any of Aspects 1 through 7, further comprising: transmitting, to a network node, a channel state information report that indicates the reciprocity of the link associated with a reported channel state information reference signal resource indicator or synchronization signal block resource indicator.

Aspect 9: The method of any of Aspects 1 through 8, further comprising: transmitting, to a network node, a UE beam correspondence capability indicating that the UE fulfills a beam correspondence requirement without an uplink beam sweeping, wherein the UE beam correspondence capability is observed based at least in part on the link being associated with the reciprocity, or the UE beam correspondence capability is not observed based at least in part on the link not being associated with the reciprocity.

Aspect 10: The method of any of Aspects 1 through 9, further comprising: receiving, from a network node and via the link that is not associated with the reciprocity, a synchronization signal block (SSB) or channel state information reference signal (CSI-RS); and wherein performing the action comprises: preventing the SSB or CSI-RS from being used as spatial relation information or as an associated CSI-RS; or preventing the SSB or CSI-RS from being used as a pathloss reference signal for an uplink transmission. wherein performing the action comprises: preventing the SSB or CSI-RS from being used as spatial relation information or as an associated CSI-RS; or preventing the SSB or CSI-RS from being used as a pathloss reference signal for an uplink transmission.

Aspect 11: The method of any of Aspects 1 through 10, further comprising: receiving, from a network node and via the link that is not associated with the reciprocity, a positioning reference signal (PRS) or a sounding reference signal (SRS) for positioning; and wherein performing the action comprises preventing the PRS or the SRS for positioning from being used for positioning, and wherein the positioning includes a round-trip-time based positioning.

Aspect 12: The method of any of Aspects 1 through 11, further comprising: receiving, via the link that is not associated with the reciprocity, a reference signal, wherein the reference signal is a sounding reference signal; and wherein performing the action comprises preventing the reference signal from being used for a bidirectional cross-link interference measurement.

Aspect 13: The method of any of Aspects 1 through 12, further comprising: selecting a sensing beam based at least in part on whether a transmit beam is associated with the reciprocity, wherein the sensing beam corresponds to the transmit beam based at least in part on the transmit beam being associated with the reciprocity, or the sensing beam is a wide beam as compared to the transmit beam based at least in part on the transmit beam not being associated with the reciprocity.

Aspect 14: A method of wireless communication performed by an apparatus of a network node, comprising: transmitting, to a user equipment (UE), an indication of a classification of a link established between the network node and the UE via a reconfigurable intelligent surface (RIS), wherein the classification indicates whether the link is associated with a reciprocity, and wherein the reciprocity includes a beam correspondence and channel reciprocity via the RIS.

Aspect 15: The method of Aspect 14, wherein the classification of the link is based at least in part on a bi-directional sounding procedure, wherein the classification of the link is determined based at least in part on a comparison between a reported channel state information (CSI) associated with a downlink channel state information reference signal and a measured CSI associated with an uplink sounding reference signal.

Aspect 16: An apparatus for wireless communication at a device, comprising a processor; memory coupled with the processor; and instructions stored in the memory and executable by the processor to cause the apparatus to perform the method of one or more of Aspects 1-13.

Aspect 17: A device for wireless communication, comprising a memory and one or more processors coupled to the memory, the one or more processors configured to perform the method of one or more of Aspects 1-13.

Aspect 18: An apparatus for wireless communication, comprising at least one means for performing the method of one or more of Aspects 1-13.

Aspect 19: A non-transitory computer-readable medium storing code for wireless communication, the code comprising instructions executable by a processor to perform the method of one or more of Aspects 1-13.

Aspect 20: A non-transitory computer-readable medium storing a set of instructions for wireless communication, the set of instructions comprising one or more instructions that, when executed by one or more processors of a device, cause the device to perform the method of one or more of Aspects 1-13.

Aspect 21: An apparatus for wireless communication at a device, comprising a processor; memory coupled with the processor; and instructions stored in the memory and executable by the processor to cause the apparatus to perform the method of one or more of Aspects 14-15.

Aspect 22: A device for wireless communication, comprising a memory and one or more processors coupled to the memory, the one or more processors configured to perform the method of one or more of Aspects 14-15.

Aspect 23: An apparatus for wireless communication, comprising at least one means for performing the method of one or more of Aspects 14-15.

Aspect 24: A non-transitory computer-readable medium storing code for wireless communication, the code comprising instructions executable by a processor to perform the method of one or more of Aspects 14-15.

Aspect 25: A non-transitory computer-readable medium storing a set of instructions for wireless communication, the set of instructions comprising one or more instructions that, when executed by one or more processors of a device, cause the device to perform the method of one or more of Aspects 14-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
transmit an indication of a classification of a link established between the UE and a network node, wherein the classification of the link is based at least in part on a bi-directional sounding procedure, wherein the classification indicates whether the link is associated with a reciprocity, and wherein the reciprocity includes a beam correspondence and channel reciprocity; and
perform an action based at least in part on the classification of the link.

2. The apparatus of claim 1, wherein the classification of the link is a binary classification, wherein a first classification is associated with the link being associated with the reciprocity, and
a second classification is associated with the link not being associated with the reciprocity.

3. The apparatus of claim 1, wherein the classification of the link is based at least in part on a metric associated with the link, wherein the link is associated with the reciprocity based at least in part on the metric satisfying a threshold, and the link is not associated with the reciprocity based at least in part on the metric not satisfying the threshold, and wherein the threshold is based at least in part on one or more of: a network node implementation, a network node capability, a UE implementation, or a UE capability.

4. The apparatus of claim 1, wherein the link is associated with the reciprocity depending on one or more link characteristics associated with the link.

5. The apparatus of claim 4, wherein:
the one or more link characteristics are associated with a path between the UE and the network node, wherein the path is one or more of: a direct path between the UE and the network node, or a reflected path between the UE and the network node via a reconfigurable intelligent surface (RIS), and wherein the reciprocity is a function of a weight of each path based at least in part on the link being associated with a combination of direct paths and reflected paths; or
the one or more link characteristics are associated with one or more of: an incident angle of a signal directed to the RIS, or a reflected angle of a signal reflected from the RIS.

6. The apparatus of claim 1, wherein the bi-directional sounding procedure comprises a comparison between a reported channel state information (CSI) associated with a downlink channel state information reference signal and a measured CSI associated with an uplink sounding reference signal.

7. The apparatus of claim 1, wherein the classification of the link is defined by an operator during an initial deployment of the network node and a reconfigurable intelligent surface (RIS), and
wherein the reciprocity is associated with a synchronization signal block beam.

8. The apparatus of claim 1, wherein the one or more processors are further configured to:
transmit, to the network node, a channel state information report that indicates the reciprocity of the link associated with a reported channel state information reference signal resource indicator or synchronization signal block resource indicator.

9. The apparatus of claim 1, wherein the one or more processors are further configured to:
transmit, to the network node, a UE beam correspondence capability indicating that the UE fulfills a beam correspondence requirement without an uplink beam sweeping, wherein the UE beam correspondence capability is observed based at least in part on the link being associated with the reciprocity, or the UE beam correspondence capability is not observed based at least in part on the link not being associated with the reciprocity.

10. The apparatus of claim 1, wherein the one or more processors are further configured to:
receive, from the network node and via the link that is not associated with the reciprocity, a synchronization signal block (SSB) or channel state information reference signal (CSI-RS);
and wherein the one or more processors, to perform the action, are configured to:
prevent the SSB or CSI-RS from being used as spatial relation information or as an associated CSI-RS; or
prevent the SSB or CSI-RS from being used as a pathloss reference signal for an uplink transmission.

11. The apparatus of claim 1, wherein the one or more processors are further configured to:
receive, from the network node and via the link that is not associated with the reciprocity, a positioning reference signal (PRS) or a sounding reference signal (SRS) for positioning; and
wherein the one or more processors, to perform the action, are configured to prevent the PRS or the SRS from being used for the positioning, wherein the positioning includes a round-trip-time-based positioning.

12. The apparatus of claim 1, wherein the one or more processors are further configured to:
receive, via the link that is not associated with the reciprocity, a reference signal, wherein the reference signal is a sounding reference signal; and
wherein the one or more processors, to perform the action, are configured to prevent the reference signal from being used for a bidirectional cross-link interference measurement.

13. The apparatus of claim 1, wherein the one or more processors are further configured to:
select a sensing beam based at least in part on whether a transmit beam is associated with the reciprocity, wherein the sensing beam corresponds to the transmit beam based at least in part on the transmit beam being associated with the reciprocity, or the sensing beam is a wide beam as compared to the transmit beam based at least in part on the transmit beam not being associated with the reciprocity.

14. An apparatus for wireless communication at a network node, comprising:
one or more memories; and
one or more processors, coupled to the one or more memories, configured to:
transmit, to a user equipment (UE), an indication of a classification of a link established between the network node and the UE, wherein the classification of the link is based at least in part on a bi-directional sounding procedure, wherein the classification indicates whether the link is associated with a reciprocity, and wherein the reciprocity includes a beam correspondence and channel reciprocity.

15. The apparatus of claim 14, wherein the bi-directional sounding procedure comprises a comparison between a reported channel state information (CSI) associated with a downlink channel state information reference signal and a measured CSI associated with an uplink sounding reference signal; and
wherein the one or more processors, to transmit the indication of the classification of the link, are configured to:
transmit the indication of the classification of the link via a reconfigurable intelligent surface (RIS), wherein the channel reciprocity is via the RIS.

16. A method of wireless communication performed by an apparatus of a user equipment (UE), comprising:
transmitting an indication of a classification of a link established between the UE and a network node, wherein the classification of the link is based at least in part on a bi-directional sounding procedure, wherein the classification indicates whether the link is associated with a reciprocity, and wherein the reciprocity includes a beam correspondence and channel reciprocity; and
performing an action based at least in part on the classification of the link.

17. The method of claim 16, wherein the classification of the link is a binary classification, wherein a first classification is associated with the link being associated with the reciprocity, and
a second classification is associated with the link not being associated with the reciprocity.

18. The method of claim 16, wherein the classification of the link is based at least in part on a metric associated with the link, wherein the link is associated with the reciprocity based at least in part on the metric satisfying a threshold, and the link is not associated with the reciprocity based at least in part on the metric not satisfying the threshold, and wherein the threshold is based at least in part on one or more of: a network node implementation, a network node capability, a UE implementation, or a UE capability.

19. The method of claim 16, wherein the link is associated with the reciprocity depending on one or more link characteristics associated with the link.

20. The method of claim 19, wherein:
the one or more link characteristics are associated with a path between the UE and the network node, wherein the path is one or more of: a direct path between the UE and the network node, or a reflected path between the UE and the network node via a reconfigurable intelligent surface (RIS), and wherein the reciprocity is a function of a weight of each path based at least in part on the link being associated with a combination of direct paths and reflected paths; or
the one or more link characteristics are associated with one or more of: an incident angle of a signal directed to the RIS, or a reflected angle of a signal reflected from the RIS.

21. The method of claim 16, wherein the classification of the link is determined based at least in part on a comparison between a reported channel state information (CSI) associated with a downlink channel state information reference signal and a measured CSI associated with an uplink sounding reference signal.

22. The method of claim 16, wherein the classification of the link is defined by an operator during an initial deployment of the network node and a reconfigurable intelligent surface (RIS), and
wherein the reciprocity is associated with a synchronization signal block beam.

23. The method of claim 16, further comprising:
transmitting, to the network node, a channel state information report that indicates the reciprocity of the link associated with a reported channel state information reference signal resource indicator or synchronization signal block resource indicator.

24. The method of claim 16, further comprising:
transmitting, to the network node, a UE beam correspondence capability indicating that the UE fulfills a beam correspondence requirement without an uplink beam sweeping, wherein the UE beam correspondence capability is observed based at least in part on the link being associated with the reciprocity, or the UE beam correspondence capability is not observed based at least in part on the link not being associated with the reciprocity.

25. The method of claim 16, further comprising:
receiving, from the network node and via the link that is not associated with the reciprocity, a synchronization signal block (SSB) or channel state information reference signal (CSI-RS); and
wherein performing the action comprises:
preventing the SSB or CSI-RS from being used as spatial relation information or as an associated CSI-RS; or
preventing the SSB or CSI-RS from being used as a pathloss reference signal for an uplink transmission.

26. The method of claim 16, further comprising:
receiving, from the network node and via the link that is not associated with the reciprocity, a positioning reference signal (PRS) or a sounding reference signal (SRS) for positioning; and
wherein performing the action comprises preventing the PRS or the SRS from being used for the positioning, wherein the positioning includes a round-trip-time-based positioning.

27. The method of claim 16, further comprising:
receiving, via the link that is not associated with the reciprocity, a reference signal, wherein the reference signal is a sounding reference signal; and
wherein performing the action comprises preventing the reference signal from being used for a bidirectional cross-link interference measurement.

28. The method of claim 16, further comprising:
selecting a sensing beam based at least in part on whether a transmit beam is associated with the reciprocity, wherein the sensing beam corresponds to the transmit beam based at least in part on the transmit beam being associated with the reciprocity, or the sensing beam is a wide beam as compared to the transmit beam based at least in part on the transmit beam not being associated with the reciprocity.

29. A method of wireless communication performed by an apparatus of a network node, comprising:

transmitting, to a user equipment (UE), an indication of a classification of a link established between the network node and the UE, wherein the classification of the link is based at least in part on a bi-directional sounding procedure, wherein the classification indicates whether the link is associated with a reciprocity, and wherein the reciprocity includes a beam correspondence and channel reciprocity.

30. The method of claim 29, wherein the bi-directional sounding procedure comprises a comparison between a reported channel state information (CSI) associated with a downlink channel state information reference signal and a measured CSI associated with an uplink sounding reference signal;

wherein the indication of the classification of the link is transmitted via a reconfigurable intelligent surface (RIS); and wherein the channel reciprocity is via the RIS.

* * * * *